United States Patent [19]

Kohashi

[11] 3,909,116

[45] Sept. 30, 1975

[54] LIGHT MODULATING DEVICE

[75] Inventor: Tadao Kohashi, Kawasaki, Japan

[73] Assignee: Matsushita Electric Industrial Co., Ltd., Kadoma, Japan

[22] Filed: Sept. 11, 1973

[21] Appl. No.: 396,174

[30] Foreign Application Priority Data
  Sept. 11, 1972  Japan.............................. 47-91535
  Oct. 19, 1972  Japan............................ 47-105118

[52] U.S. Cl.............. 350/267; 204/299; 350/160 R
[51] Int. Cl.²........................................ G05D 25/00
[58] Field of Search.......... 350/160 R, 267; 204/299

[56] References Cited
UNITED STATES PATENTS
3,668,106  6/1972  Ota ..................................... 204/199
3,756,693  9/1973  Ota ................................. 350/160 R Primary Examiner—Ronald L. Wibert
Assistant Examiner—F. L. Evans

[57] ABSTRACT

A light modulating device comprising a heterogeneous layer containing an electrokinetically movable liquid material and a solid substance polarizable with respect to the liquid. By establishing an electrical field in the layer the electrokinetically movable liquid is caused to move to vary the transmissivity of the layer to visible light. The electrical field is spatially modulated by electric charges in accordance with an image pattern and the incident light is modulated in exact correspondence with the modulated electrical field. The spatial modulation of the electrical field is effected by the incident ultraviolet light or X-ray radiation or by the impingement of an electron beam in a vacuum chamber.

17 Claims, 13 Drawing Figures

LIGHT MODULATING DEVICE

This invention relates generally to light modulating devices, and particularly to devices for modulating light of visible wavelengths by the movement of an electrokinetically movable liquid material.

Light modulating devices known to the art include a system known as Eidophor (Trade Name) which utilizes the variation in film thickness of non-polarizable solution such a silicon oil by bombarding highly accelerated electrons. The electrons accumulate on the electron beam side of the film to cause an electrostatic force to occur between the opposite surfaces, thus causing a variation in film thickness in proportion to the volume of accumulated electron charge. Light passing through the film is thus diffracted in accordance with the varied film thickness. Also known to the art is a system in which electron charges are developed on the surface of a silicon oil film by means of corona discharge. For purposes of converting the diffracted light into intensity-modulated light and projecting it onto a screen, these systems employ a Schlielen lens system which is a complicated, expensive optical arrangement. Another disadvantage is that these systems require a high tension voltage for accelerating electrons or generating corona discharge. Still another disadvantage in the former prior art system is that the repeated bombardments by the highly accelerated electrons would cause the silicon oil film to vaporize and result in a short usable life time.

The present invention contemplates the use of electrokinetical phenomena involving relative mechanical motion in a heterogeneous system containing a liquid phase in which an electrical field is set up. When a liquid is confined in a fixed chamber, charged particles are caused to move under the influence of an electrical field. This phenomenon is called electrophoresis. If the liquid is movably held, the liquid rather than the particles is caused to move. This phenomenon is called electroosmosis. In more detail, the heterogeneous system may comprise a liquid material and a solid matter either in the form of particles or dye dispersed therein or a substrate in contact therewith at an interface. In either case, interfacial electric double layers of given type of charges develop at the interface between the solid and liquid materials. If the solid material is particles, the particles move under the influence of an electrical field and if the solid material is a substrate interfacing with the liquid material, the liquid rather than the particles is caused to move as previously described. The type of charge acquired by the liquid is determined by the relative value of dielectric constants of the solid and liquid materials: that is, if the substrate has a larger value of dielectric constant than that of the liquid, the substrate acquires positive charge and the liquid negative charge.

It is accordingly an object of the present invention to provide an improved light modulating device which is free from such disadvantages experienced in the prior art systems.

Another object of the invention is to provide an improved light modulating device for eliminating the need for provision of an expensive Schlielen lens system.

Still another object of the invention is to provide an improved light modulating device for converting invisible image radiation into visible image.

A further object of the invention is to provide an improved device for modulating high intensity light for projection purposes.

According to one aspect of the invention, there is provided a light modulating device in which a heterogeneous system containing a liquid material and electrophoretically movable charged coloring agent or particles is confined in a fixed chamber in the form of a layer. Means are provided for setting up electrical fields for causing the coloring agents or particles to move to spatially vary the transmissivity of the liquid layer. Visible light passing through the layer is thus modulated in intensity in accordance with the spatially varied transmissivity. According to another aspect of the invention, there is provided a light modulating device in which a heterogeneous system containing an electroosmotically movable liquid and coloring agent or particles is disposed in the form of a layer on a substrate having a dielectric constant differing in value from that of the electroosmotically movable liquid. Electric double layers of given type charges develop at the interface between the substrate and the liquid layer and the charge on the side of the liquid layer is caused to move under the influence of an electrical field together with the coloring agent or particles. Means are also provided for setting up electrical fields to cause spatially varied movements of the charged liquid in order to produce spatial variations in the transmissivity of the liquid layer, whereby visible light passing therethrough is modulated in accordance with the variations in the transmissivity.

These and other advantages and features of the present invention will be better understood from the following description when taken in conjunction with the accompanying drawings, in which.

Figure 1:
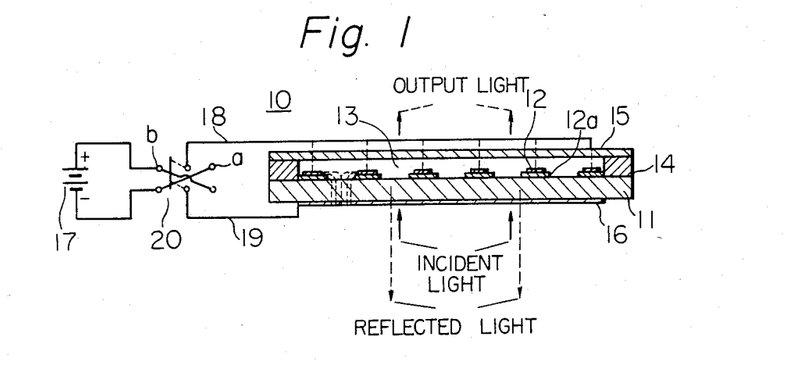
FIG. 1 is a cross-sectional view of a light modulating device of a first preferred embodiment in accordance with the present invention.

For detailed description of the present invention, reference is now made to FIGS. 1 through 4. In FIG. 1 there is shown a first embodiment of a light modulating device according to the present invention. The light modulating device is indicated at reference numeral 10 and generally comprises a light-pervious substrate 11, about 10 to 100 microns thick, of a material such as, for example, quarts glass, borosilicate glass or soda-lime glass and an electrode 12 comprising a plurality of spacedly arranged, light-opaque conductive strips made of, for example, carbon, the electrode being disposed on the upper surface of the substrate 11. The conductive strips conveniently have a width of 30 to 100 microns and arranged at a spacing of 30 to 100 microns therebetween. It is to be understood that the electrode 12 may advantageously be constructed on a perforated or meshed member having preferably 100 to 200 meshes. A liquid layer 13 of a heterogeneous system containing a light-pervious liquid material and an electrophoretically movable solid coloring material is disposed on the substrate 11 through the interstices of the electrode 12 to a thickness in the range of 200 to 500 microns. A framed projection 14 is formed at the periphery of the upper surface of the substrate 11 and a light-pervious sealing member 15 is disposed fixedly on the projection 14 to form a fixed chamber so as to immovably confine the liquid material therein. A light-pervious planar electrode 16 made of a material such as, for example, tin oxide or copper iodide is fixedly provided on the lower surface of the substrate 11. In case where the electrode 12 is a strip electrode as employed in the present embodiment, the electrode 16 may be of a similar construction to that of the electrode 12 rather than the planar electrode and comprise a plurality of parallelly spaced strips each being arranged in alternating relationship with the strips of the electrode 12 and having a width much smaller than that of the interstices of the electrode 12. It is to be understood that in such an arrangement the electrode 16 in the form of a plurality of strips may be made light-opaque on account of the narrow width of the strips. The electrodes 12 and 16 are connected to opposite terminals of a direct-current voltage supply 17 through leads 18 and 19 by way of neutral terminals of a reversible switch 20. Electrical fields are set up between the two electrodes 12 and 16. However, the electrical lines of force in the interstices of the electrode 12 bend sideways towards the adjacent conductive strips and substantially horizontal electrical fields are established in opposite directions near the lower surface of the layer 13. In the layer 13 of the heterogeneous system, interfacial charges develop between the liquid light-pervious material and the electrophoretically movable solid coloring material. The type of the interfacial charge is determined in relation between the liquid and solid materials used. The liquid material, on the one hand, may be of a material having a low value of viscosity and a higher breakdown voltage and may not cause a temperature rise when a voltage is applied. This means that the liquid material may preferably have a specific resistivity greater than $10^5$ ohms-cm. The liquid material may, for example, include trycresyl phosphate, isopropyl alcohol or olive oil. The solid coloring material, on the other hand, may include a pigment or dye. As a pigment carbon black (black toner) may be employed to form a heterogeneous system with, for example, a solution of tricresyl phosphate. Also employed as a pigment for a solution of isopropyl alcohol is titanium oxide or cadmium sulfide powder. In the above-described exemplary combinations of materials, the liquid becomes negative while the solid becomes positive which is caused to move towards negative potential. In addition, olive oil can be employed as a liquid with Hansa yellow G particles and isopropyl alcohol as a liquid with patent blue A particles. In these cases, the liquid becomes positive while the solid becomes negative. It is to be understood that since the type of charges is determined by the relationship between the liquid and solid materials used, other various combinations of liquid and solid materials are possible. For example, olive oil becomes positive when it forms a heterogeneous system with Hansa yellow G particles that are negatively charged. As a dye to serve as a solid material, Methylene Blue can be employed as a cationic electrophoretic material for N,N-dimethylformamide and Eosine-Y as an anionic electrophoretic material for N,N-dimethylformamide. Although the dyes form a solution when they are mixed with the liquid material, they can also be considered to form a heterogeneous system with the liquid. In the present embodiment it is to be understood that the heterogeneous system should contain a liquid material having a given type of charge and an electrophoretically movable material of the opposite type of charge. The pigment used in the practice of the present invention may preferably have a particle size of less than 3 microns in diameter and may be mixed with the liquid at a volume percent of up to 30%, preferably, 3 to 15%. The dye may preferably be mixed with the liquid at a weight percent in the range of up to 50% depending on the dyes employed, since the introduced dye would tend to reduce the breakdown voltage of the layer 13. Since the present embodiment involves application of a voltage between the substrate 11, the specific resistivity of the light-pervious liquid material may preferably have an equal value to that of the substrate, that is $10^5$ to $10^{10}$ ohms-cm.

Figures 2A, 2B:
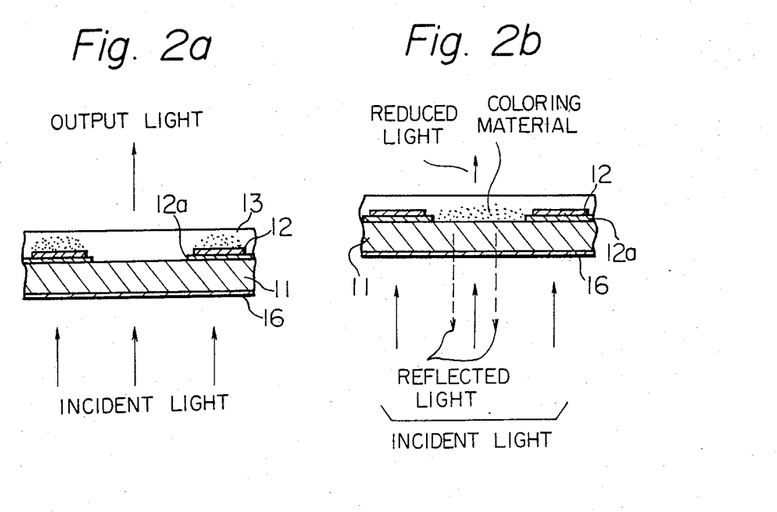
FIGS. 2a and 2b are enlarged fragmentary cross-sectional views of FIG. 1 for explanation of an electrophoretical movement of charged particles under the influence of an electrical field.

Assume that carbon black is used as an electrophoretic movable material and tricresyl phosphate as a light-pervious liquid, the carbon black tends to become cationic. Upon application of a voltage between the electrodes 12 and 16 with the reversible switch being turned on the *a* position to give a negative potential to the electrode 12, the carbon black particles present in the interstice of the electrode 12 are caused to move towards the adjacent strip electrodes as illustrated in FIG. 2a. Only that portion of light which falls on the interstice portion of the electrode 12 is thus allowed to pass therethrough and emerges as a spatially modulated light on the other side of the light modulating device. When the reversible switch is turned to the *b* position, the electrode 12 is positively biased, and the carbon black particles on the upper surface of the electrode 12 are repelled and caused to move towards the interstice as shown in FIG. 2b. The transmissivity of that portion of the layer 13 increases and the light is substantially prevented from emerging on the output side of the device. Under this circumstance, the repelling action would cause the particles to move further away from the edges of the electrode 12 and that portions of the interstice which are immediate to the electrode edges are cleared of the coloring particles and allow light to pass therethrough producing unwanted narrow streaks of light. To prevent this, light-opaque non-conductive strips 12a having a width 20 to 50 microns wider than that of the individual strips of the electrode are interposed between the substrate 11 and the electrode 12 as shown in FIG. 1. The opaque strips 121a may be provided by evaporating a cermet such as magnesium fluoride ($MgF_2$) and indium (In). If cadmium selenide particles are employed as an electrophoretic material, the light is allowed to pass through the layer when the electrode 12 is at a positive potential while substantially no light emerges when the electrode is at a negative potential. In addition, if two kinds of electrophoretic materials are combined, one having a first color of a given type of charge and the other having a second color of the opposite type of charge, a light of either color can be selectively obtained. If, for example, carbon black particles as positively charged particles and titanium oxide or aluminum oxide particles as negatively charged light-reflective white particles are used as a mixed electrophoretic material, the white particles will be collected in the interstice portion of the electrode while the black particles will be caused to move further away from the interstice when the electrode is biased negative. This results in the reflection of a white light on the white colored layer 13 as shown in dotted lines in FIG. 2b. If N,N-dimethylformamide is used as a liquid and Eosine-Y is used as a red-colored negatively charged electrophoretic dye, a red light will emerge from the output side of the device when the electrode is positive while colorless light will emerge when the electrode is negative. If Methylene Blue as a positively charged dye is used in addition to the Eosine-Y, a red light will be obtained when the electrode is positive and a blue light when the electrode is negative.

Figure 3:
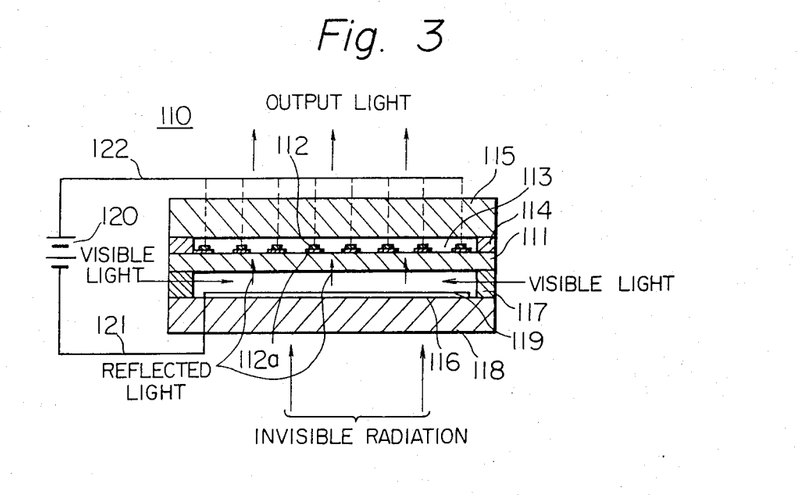
FIG. 3 is a cross-sectional view of a variation of the FIG. 1 embodiment.

In the foregoing description, electrical fields are set up by application of opposite potentials between the oppositely facing electrodes and the potentials can be switched to control the passage of light. The present invention is also applicable to conversion of ultraviolet or X-ray image radiation into a visible image. In FIG. 3 there is shown a variation of the first preferred embodiment of the invention to carry out this purpose. The light modulating device 110 of FIG. 3 comprises a light-pervious substrate 111 of the same material as used in the previous embodiment, a strip electrode 112 of the same construction arranged on the upper surface of the substrate with light-opaque non-conductive strips 112a being interposed between the electrode 112 and the substrate 111. The layer 113 of the same components as in FIG. 1 is confined in a fixed chamber defined by the upward projections 114 and the light-pervious sealing member 115. On the lower side of the substrate 111 is provided a chamber 116 defined by a supporting member 118 made of a material pervious to light of invisible range of the spectrum such as quartz glass and light-pervious members or spacers 117 interposed between the substrate 111 and the supporting member 118. On the inner surface of the supporting member 118 is provided a photocathode 119 at a spacing of 200 to 500 microns from the lower surface of the substrate 111. When X-ray radiation is used for the image conversion, the supporting member 118 may be made of acryl resin on which aluminum is evaporated to serve as the photocathode. When ultraviolet light is employed, the supporting member may be made of quartz glass on which gold is evaporated to serve as the photocathode. The chamber 116 may be a vacuum or preferably be filled with ionizable gas such as air or nitrogen to multiply photoemission. The photocathode 119 is connected to the negative terminal of a direct-current voltage supply 120 having a potential of 200 to 700 volts through lead 121 and the strip electrode 112 is connected to the positive terminal through lead 122. Incident image-carrying ultraviolet or X-ray radiation on the photocathode 119 causes photoelectrons to be ejected toward the electrode 112. The photoelectrons are accelerated by the d.c. potential and liberate electrons upon collision with the gas molecule. The liberated electrons accumulate on the lower surface of the substrate 111 and modulate the original uniform electrical field in accordance with the image carried by the incident radiation to form a charged pattern. The charge coloring material in the layer 13 is caused to move in exact correspondence with the charged pattern, and hence the variation in the transmissivity of the layer. In more detail, an intensified photoelectrical image is produced in the gas-filled chamber 116 and the interstice portions of the electrode 112 are made negative relative to the strip electrode portions. If the layer 113 contains positively charged electrophoretically movable dye such as Eosine-Y, the dye will be caused to move towards the negative charge created by the photoemission, and the density of the dye in the interstice will increase and a red-colored negative image will result. The negative image thus formed can be made to persist for a long duration after removal of the incident radiation by using a highly insulative material as the substrate 111, since the time constant determines the image decay time. On the other hand, if the substrate is made resistive by suitably choosing its material, the time constant will be made small to enable the output light to instantly change with the incident radiation by quick discharge. If the layer 13 contains negatively charged electrophoretically movable dye or pigment, electrophorectic movement is contrary to the above and a positive colored image will result at the output side of the device 110. In addition, if the visible light has a wavelength different from that of the coloring material of the layer 13, the visible light is modulated in intensity rather than in color.

Figure 4:
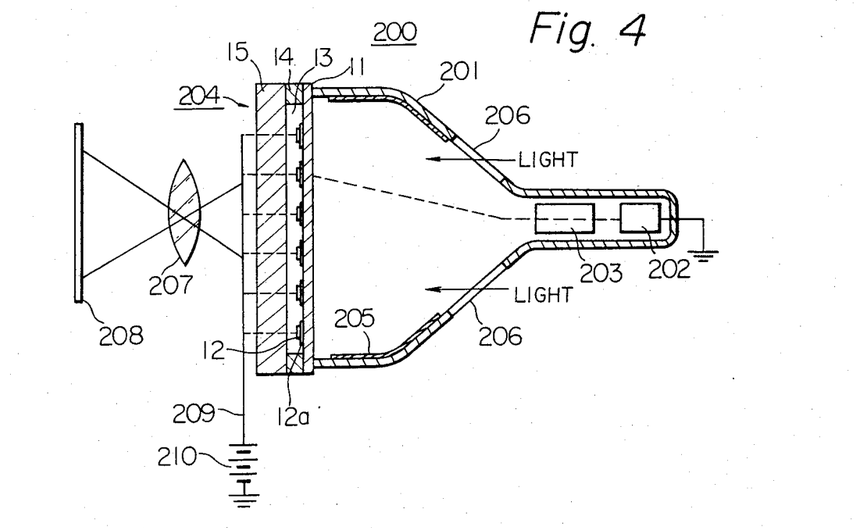
FIG. 4 is a cross-sectional view of another variation of the FIG. 1 embodiment.

From the foregoing description, it will be understood that image-carrying charges can also be produced by scanning a signal modulated electron beam across the lower surface of the substrate. In FIG. 4 there is shown a display system generally indicated at 200 embodying the light modulating device of FIG. 1. The display system 200 comprises an evacuated envelope 201 having an electron gun 202 at one end thereof, means 203 for deflecting a beam of electrons emitted from the electron gun 202, as constructed in the usual manner. To the other end of the envelope a light modulating device 204 in accordance with the present invention is sealed to provide a vacuum chamber. The evacuated envelope 201 is provided with a metal backing 205 to serve as an anode for accelerating the electron beam towards the light modulating device 204 and a window 206 for permitting visible light to pass therethrough for illuminating the light modulating device. The light modulating device 204 is constructed in much the same manner as that previously described except that the light-pervious electrode 16 of FIG. 1 is omitted and that the light-pervious sealing member 15 has a thickness of 2 to 5 millimeters to withstand the atmospheric pressure acted thereon. The electrode 12 is given positive or higher potential with respect to the electron gun 202 by way of lead 209 and a d.c. voltage supply 210 to establish an electrical field in the layer 13. As the electron beam is scanned across the inner surface of the substrate 11 of the light modulating device 204, electrical charges accumulate with a given polarity depending on the speed of accelerated electrons. If the electron beam has a speed sufficient to produce secondary electrons as it impinges on the substrate 11 at a secondary emission ratio of greater than unity, positive charges develop on the substrate, while the electron beam is accelerated at a secondary emission ratio of smaller than unity, negative charges develop. Since the electron beam is modulated in intensity in accordance with the image signal applied to the electron gun as in the usual manner, the charges developed across the surface of the substrate 11 are an exact replica of the image scene, and the electrophoretic movement occurs in exact correspondence with the charged image. This causes corresponding variations in the transmissivity of the liquid layer 13. As visible light of high intensity is admitted through the window 206, the light is modulated in the same manner as previously described. The modulated light is projected by means of a lens 207 onto a screen 208.

Figure 5:
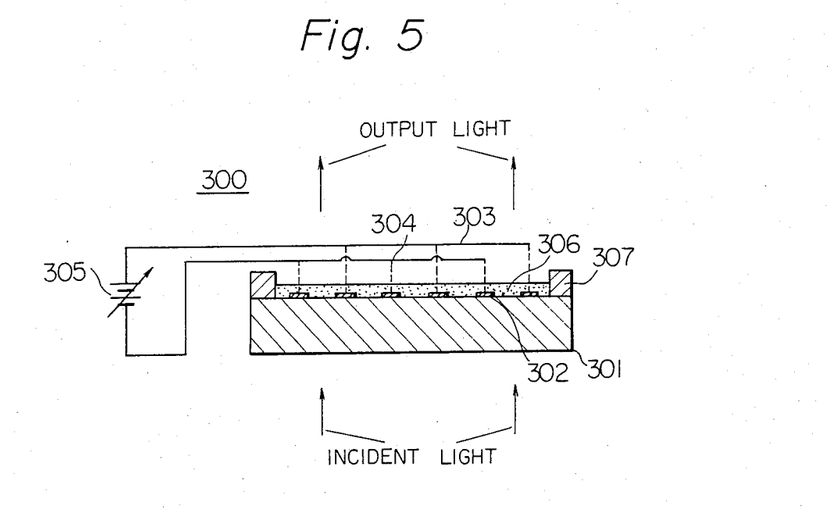
FIG. 5 is a cross-sectional view of a light modulating device of a second preferred embodiment in accordance with the present invention.

Reference is now made to FIGS. 5 through 9b wherein a second preferred embodiment of the present invention is shown. In FIG. 5 a light modulating device 300 is shown and comprises a light-pervious substrate 301, spaced electrodes 302 having a plurality of parallelly spaced strip electrodes biased alternately to opposite polarities through leads 303 and 304 to a direct-current voltage supply 305. The electrodes 302 may be of a material such as tin oxide and each of the strip electrodes has a width of about 100 microns and arranged at a spacing of about 100 microns. A layer 306 of a heterogeneous system containing an electroosmotically movable liquid material and a coloring material. The layer is uniformly applied on the substrate 301 through the interstices of the electrodes 302 and held in place by means of a frame projection 307. In the present embodiment, the heterogeneous system comprises tricresyl phosphate as an electroosmotically movable liquid and a coloring material such as a pigment or dye. Interfacial charges develop between the liquid and the coloring material if the coloring material is made cationic or anionic depending on the liquid material used. If the liquid has a dielectric constant different from that of the substrate, an interfacial charge develops at the interface between the liquid and the substrate and the coloring material is not necessarily an ionic material when mixed with the liquid. In the present embodiment, the substrate is made of quartz glass, the liquid of tricresyl phosphate is made positive with respect to the substrate. In the case of tricresyl phosphate being as a positively charged liquid, the coloring material may preferably be a positively charged pigment or dye (although non-ionic substance is useful) such as carbon black (pigment) or Methylene Blue as a cationic dye, or fluorescein or phenothiazine as a non-ionic dye. In order to provide a color to the liquid, the coloring pigment should have a particle size of up to 3 microns. The amount of the coloring pigment is determined by a compromise between the mobility and electrical resistance of the liquid (if the coloring pigment has a low specific resistivity) and the degree of color saturation. It was found that preferable amount of the pigment is from 1 to 10% of the liquid by volume percentage.

Figure 6A:
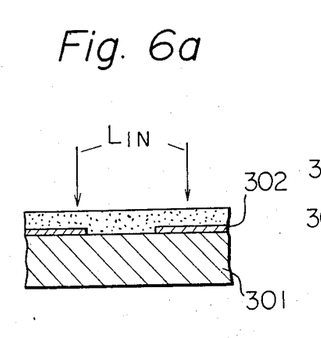
FIGS. 6a and 6b are enlarged fragmentary cross-sectional views of FIG. 5 for explanation of the electroosmotical movement of a liquid material under the influence of an electrical field.
Figure 6B:
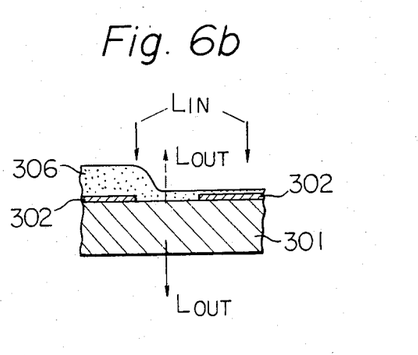

Upon application of the voltage, the tricresyl phosphate liquid is caused to move towards the negatively biased electrodes together with the coloring pigment to cause the layer thickness to vary as shown in FIG. 6b, thus allowing a light to pass through the thinned portion of the layer. The thickness of the layer is varied in proportion to the applied voltage. It was found that the magnitude of the electrical field produced in the layer to effect an electroosmotic phenomenon was $10^{-2}$ volts per micron. Therefore, a voltage of from several volts to several ten volts is necessary for an electrode spacing of 100 microns.

Assume that Methylene Blue is used as a catinnic dye for tricresyl phosphate and a colored light having a different wavelength from that of Methylene Blue, for example, a red light is used as an incident light, the amount of red light passing through the layer increases as the layer thickness decreases with the increase of the voltage, and vice versa. If white light is used, the blue light emerges with increasing intensity on voltage rise.

Glycerin may also be used as a liquid electroosmotic material. In this case it moves towards negative potential as it acquires positive charge with respect to the substrate of quartz glass or borosilicate glass. If the borosilicate glass substrate is used, electroosmotic material includes water, propyl alcohol, allyl alcohol as positively charged liquid, and xylene, ethylether, toluen and olive oil as negatively charged liquid.

Figure 7A:
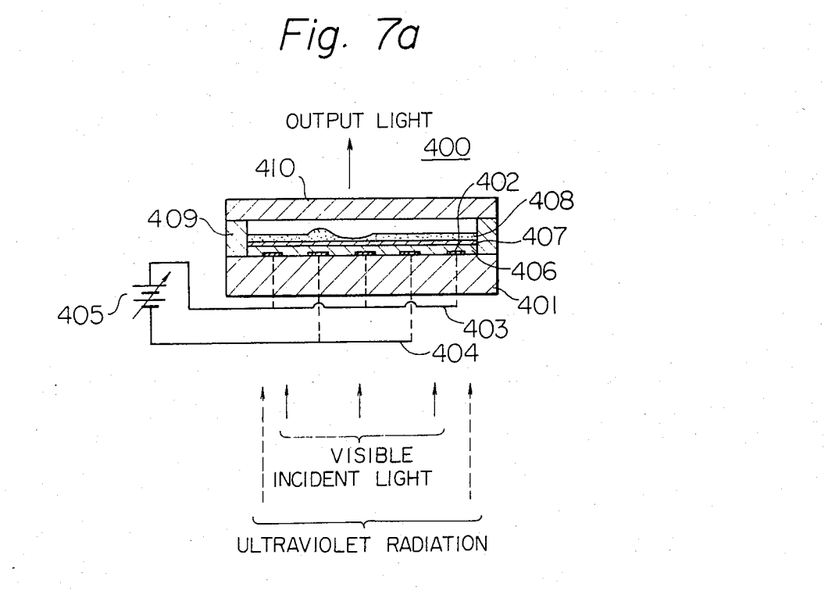
FIGS. 7a and 7b are cross-sectional views of a variation of the FIG. 5 embodiment.
Figure 7B:
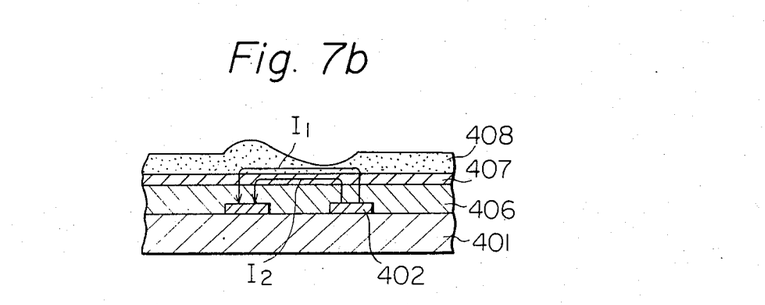

In FIG. 7a there is shown a variation of the second embodiment of the present invention. The light modulating device 400 of FIG. 7a comprises a substrate 401 of a transparent material such as quartz or acryl resin plate and parallelly spaced electrodes 402 alternately at opposite potentials through leads 403 and 404 to a direct-current voltagge supply 405. A layer 406 of a light-pervious material having a specific resistivity of from resistive $10^8$ to $10^9$ ohms-cm smaller than the dark resistivity of the photoconductive layer 407 such as vitreous enamel or plastic having a thickness of about 10 microns is disposed on the substrate 401 through the interstices of the electrodes 402. The device 400 further comprises a photoconductive layer 407 about 10 microns thick disposed on the light-pervious resistive layer 406. The photoconductive layer is composed of a material responsive to light of the ultraviolet region of the spectrum, such as polyvinyl carbazole. It is to be noted that the combined thickness of the layers 406 and 407 may preferably be smaller than the width of the interstice of the electrode 402 and that the dark resistivity of the photoconductive layer is greater than the specific resistivity of the layer 408 containing an electroosmotically movable liquid and a coloring material as described in the previous embodiment disposed on the photoconductive layer. In relation to the materials used in the layer 408, the dark-current resistivity of the photoconductive layer should be greater than $10^{10}$ ohms-cm. The liquid layer 408 is held at a uniform thickness by means of a framed projection or spacer 409 disposed at the periphery of the substrate. To prevent vaporization of the liquid in the layer 408, a light-pervious member 410 is sealed to the edges of the spacer 409. Upon application of a voltage of several ten volts, an electrical current $I_1$ flows across the adjacent electrodes through the liquid layer because the liquid layer has a smaller resistivity than the dark resistivity of the photoconductive layer (FIG. 7b). The current $I_1$ causes the liquid to move towards the negatively biased electrode together with the coloring material as shown in FIG. 7a. When the photoconductive layer 407 is illuminated by an image-carrying ultraviolet radiation, its resistance will be reduced in accordance with the image to a value lower than that of the liquid layer 408, and a bypass circuit is formed under the liquid layer. Therefore, the current $I_1$ disappears and a current $I_2$ flows through the photoconductive layer. The formation of a low resistive layer under the liquid layer nullifies the original electrical field and causes the liquid to return to the original position. Therefore, a negative image will appear on the output side of the device 400 when it is illuminated by a visible light. To prevent degradation of the obtained image by the ultraviolet radiation, the light-pervious member 410 may preferably be made of a material which prevents the passage of the ultraviolet radiation.

Figure 8:
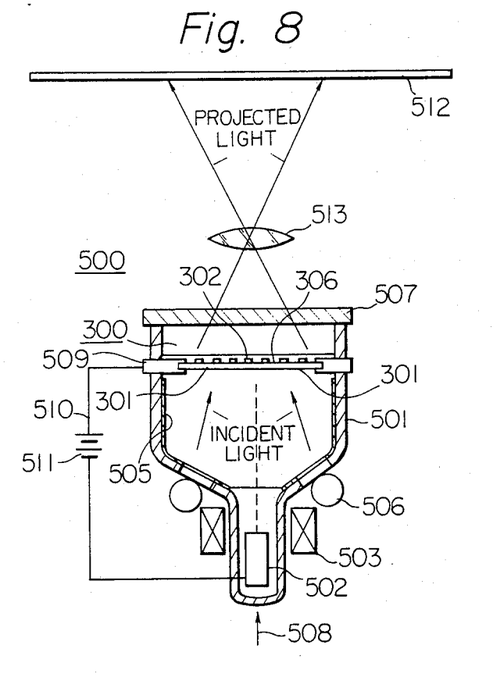
FIG. 8 is a cross-sectional view of another variation of the FIG. 5 embodiment.
Figure 9A:
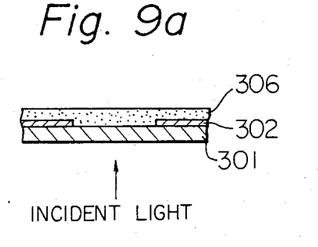
FIGS. 9a and 9b are enlarged fragmentary cross-sectional views of the light modulating device of FIG. 8 for explanation of the electroosmotical movement of a liquid material under the influence of an electrical field produced by impacting electrons.
Figure 9B:
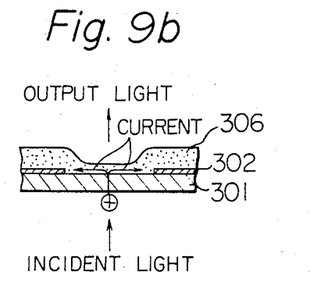

From the foregoing description, it will be understood that image-carrying charges produced by scanning a signal-modulated electron beam across the surface of the substrate 301 of the device 300 can also serve as a means for setting up electrical fields in exact correspondence with the image. In FIG. 8 there is shown a display system generally indicated at 500 embodying the light modulating device of FIG. 5. The display system 500 comprises an evacuated envelope 501 of the conventional construction having an electron gun 502 at one end thereof, means 503 for deflecting a beam of electrons emitted from the electron gun 502, as constructed in the usual manner. To the other end of the envelope a faceplate 507 is sealed, and the light modulating device 300 is positioned in parallel relation therewith at a suitable spacing therefrom. The evacuated envelope 501 is provided with a metal backing 504 to serve as an anode for accelerating the electron beam towards the light modulating device and a window 505 for permitting visible light from a light source 506 of a circular construction to pass therethrough to illuminate the device 300. The light modulating device 300 is constructed in much the same manner as that previously described except that the electrode 302 is at a uniform potential with respect to the electron gun 502 through a terminal electrode 509, lead 510 and a voltage supply 511. In the present embodiment, the light-pervious substrate 301 is made of soda-lime glass or a material containing titanium having a dielectric relaxation time of about 1/30 seconds and a specific resistivity of $10^9$ to $10^{10}$ ohms-cm. The electrode 302 may be an apertured or meshed electrode having 200 to 300 meshes. The interstices of the electrode should have a width greater than the thickness of the substrate 301. The electron beam is modulated in accordance with the signal applied to the electron gun 502 through lead 508 and scanned across the surface of the substrate 301 by means of the deflecting means 503. As the substrate is scanned, an image-laden charge of a given porality is developed across the lower surface of the substrate. When the electrons are accelerated at a higher speed so that the secondary emission rate is greater than unity, a positive charge develops. The charged image on the substrate surface is discharged through the substrate 301, the liquid layer 306, the electrode 302 and the terminal electrode 509 at a rate determined mainly by the dielectric relaxation time of the substrate. As it discharges, currents of various magnitudes in accordance with the charged image flow through the liquid layer in opposite directions towards the adjacent electrodes (FIG. 9b) and cause the liquid to move sideways. Therefore, the transmissivity of the liquid layer is spatially varied in accordance with the scanned image. By illuminating the substrate 301 using the visible light of high intensity from the light source 506, spatially modulated light emerges from the faceplate and projected onto a screen 512 by means of a lens 513. When the charge has completely discharged, the liquid returns to the original place.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A light modulating device comprising, a substrate, a liquid layer of an electrokinetically movable heterogeneous system disposed on said substrate and containing a liquid material and a coloring material, spaced electrodes, at least one of which being disposed in said layer, and means coupled to said spaced electrodes for selectively setting up electric fields in said layer to cause lateral movement of portions of said heterogeneous system in directions parallel to the surface of said layer to thereby produce variations in the transmissivity of said layer to light passing therethrough.

2. A light modulating device comprising, a substrate, a liquid layer of a heterogeneous system disposed on said substrate and containing a light-pervious liquid material of a predetermined direction of charge polarity and electrophoretic coloring material of opposite charge polarity, a first electrode disposed on one side of said substrate which is in contact with said layer, a second light pervious electrode spaced from said first electrode, a light-pervious sealing member spaced from said substrate and in contact with the surface of said layer, and means coupled to said electrodes for selectively setting up electrical fields in said layer to cause lateral movement of said coloring material to thereby produce variations in the transmissivity of said layer to light passing therethrough.

3. A light modulating device as claimed in claim 2, wherein said second electrode is disposed on the other side of said substrate.

4. A light modulating device as claimed in claim 2, wherein said second electrode comprises a photocathode spaced from the other side of said substrate for emission of electrons upon incidence thereon of invisible radiations, and means for receiving visible light in a direction parallel to the surface of said layer to define an interspace between said substrate and said photocathode.

5. A light modulating device as claimed in claim 3, wherein said first electrode comprises a plurality of parallelly spaced light-pervious conductive elements and said second electrode comprises a plurality of conductive elements arranged in alternating relationship with said light-pervious elements of said first electrode.

6. A light modulating device as claimed in claim 3, wherein said first electrode is a perforated light-pervious conductive element and said second electrode is a light-pervious planar conductive element.

7. A light modulating device as claimed in claim 4, wherein said interspace is a vacuum.

8. A light modulating device as claimed in claim 4, wherein said interspace is filled with a gas which produces ions upon excitation by electrons.

9. A light modulating device as claimed in claim 2, wherein said electrophoretic coloring material comprises particles of a first color and having a predetermined direction of charge polarity and particles of a second color and having opposite charge polarity.

10. A light modulating device as claimed in claim 2, further comprising a plurality of juxtaposed light-opaque, nonconductive members interposed between said first electrode and said substrate and having a surface area larger than that of said first electrode.

11. A light modulating device comprising, a substrate having a first dielectric constant, spaced electrodes on one side of said substrate, a colored layer of an electroosmotically movable liquid material having a second dielectric constant and disposed on said substrate through the spacing between said electrodes to product interfacial charges between the surfaces of said layer and said substrate, said liquid material containing a coloring material movable in the same direction as that of said liquid material under the influence of an electrical field, and means including said spaced electrodes for selectively setting up electrical fields in said layer to cause lateral movement of said interfacial charges to thereby produce variations in the transmissivity of said layer to light passing therethrough.

12. A light modulating device as claimed in claim 11, wherein said substrate is light pervious.

13. A light modulating device as claimed in claim 11, wherein said substrate is light reflective.

14. A light modulating device as claimed in claim 12, further comprising, a light-pervious resistive layer on said substrate and a photoconductive layer having a dark resistivity higher than the specific resistivity of said electroosmotically movable material and that of said light-pervious resistive layer, said photoconductive layer being disposed on said light pervious resistive layer and responsive to invisible radiations, said spaced electrodes being parallelly arranged and maintained selectively at opposite potentials.

15. A light modulating device as claimed in claim 11, wherein said spaced electrodes are alternately biased at opposite potentials.

16. A light modulating device as claimed in claim 11, wherein said spaced electrodes are parallelly arranged.

17. A light modulating device as claimed in claim 11, wherein said spaced electrodes comprise an apertured electrode.

* * * * *